United States Patent
Zhao et al.

(10) Patent No.: US 8,023,943 B2
(45) Date of Patent: *Sep. 20, 2011

(54) CELLULAR COMMUNICATIONS SYSTEM PROVIDING MOBILE CELLULAR DEVICE BATTERY SAVING FEATURES WHILE ACCOMMODATING USER ACCESS REQUESTS AND RELATED METHODS

(75) Inventors: Wen Zhao, Kanata (CA); Kenneth J. Liang, Kanata (CA); Jin Kim, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 1511 days.

This patent is subject to a terminal disclaimer.

(21) Appl. No.: 10/787,543

(22) Filed: Feb. 26, 2004

(65) Prior Publication Data

US 2005/0191987 A1 Sep. 1, 2005

(51) Int. Cl.
*H04W 4/00* (2009.01)
*H04B 7/00* (2006.01)

(52) U.S. Cl. ............... 455/434; 455/435.1; 455/432.1; 455/515; 455/435.2

(58) Field of Classification Search ........... 455/522, 455/525, 515, 434, 436, 574, 67.1, 401, 567, 455/403, 435.1, 452.1, 452.2, 450; 379/179–181, 379/251, 252, 256, 350–355.1, 418, 357.04, 379/31, 164

See application file for complete search history.

(56) References Cited

U.S. PATENT DOCUMENTS

| | | | |
|---|---|---|---|
| 5,017,915 A * | 5/1991 | Dang et al. | 375/231 |
| 5,193,216 A | 3/1993 | Davis | 455/67.7 |
| 5,301,225 A | 4/1994 | Suzuki et al. | 379/59 |
| 5,507,039 A | 4/1996 | Honma | 455/343 |
| 5,794,146 A | 8/1998 | Sevcik et al. | 455/434 |
| 6,400,961 B1 | 6/2002 | Lillie et al. | 455/552 |
| 6,775,548 B1 * | 8/2004 | Rong et al. | 455/452.2 |
| 6,904,294 B2 * | 6/2005 | Ozluturk et al. | 455/522 |
| 6,996,412 B2 * | 2/2006 | Hunzinger et al. | 455/510 |
| 2004/0077383 A1 * | 4/2004 | Lappetelainen et al. | 455/574 |
| 2005/0086569 A1 * | 4/2005 | Hiddink et al. | 714/749 |
| 2005/0143027 A1 * | 6/2005 | Hiddink et al. | 455/127.1 |
| 2006/0063544 A1 * | 3/2006 | Zhao et al. | 455/510 |

FOREIGN PATENT DOCUMENTS

| | | |
|---|---|---|
| EP | 0513710 | 11/1992 |
| WO | WO2004042941 | 5/2004 |

* cited by examiner

*Primary Examiner* — Charles Appiah
*Assistant Examiner* — Emem Stephen
(74) *Attorney, Agent, or Firm* — Allen, Dyer, Doppelt, Milbrath & Gilchrist, P.A.

(57) ABSTRACT

A cellular communications system may include at least one base station and at least one mobile cellular communications device. More particularly, the at least one mobile cellular communications device may include a controller, at least one user input device connected to the controller, and a wireless transceiver cooperating with the controller for attempting to establish a wireless communications link with at least one base station, and if the wireless communications link cannot be established, then continuing to attempt to establish the wireless communications link at a first attempt rate. Moreover, if a user provides a request to access the at least one base station via the at least one user input device, then the controller may continue to attempt to establish the wireless communications link based upon a second attempt rate greater than the first attempt rate.

22 Claims, 6 Drawing Sheets

CELLULAR COMMUNICATIONS SYSTEM PROVIDING MOBILE CELLULAR DEVICE BATTERY SAVING FEATURES WHILE ACCOMMODATING USER ACCESS REQUESTS AND RELATED METHODS

FIELD OF THE INVENTION

The present invention relates to the field of communications systems, and, more particularly, to cellular communications systems and related methods.

BACKGROUND OF THE INVENTION

Cellular communications systems continue to grow in popularity and have become an integral part of both personal and business communications. Cellular phones allow users to place and receive voice calls most anywhere they travel. Moreover, as cellular telephone technology has increased, so too has the functionality of cellular devices. For example, many cellular devices now incorporate personal digital assistant (PDA) features such as calendars, address books, task lists, etc. Moreover, such multi-function devices may also allow users to wirelessly access electronic mail (email) messages and the Internet via a cellular network.

Many such devices operate in an always-on, always-connected mode, in that they are continuously trying to maintain service from the wireless network. However, this can lead to problems in that if a cellular base station is administratively closed or otherwise unable to establish a wireless communications link with such a device, then the device may quickly run its battery down trying to continually establish the link. This may similarly occur if the cellular device cannot establish a link because it is out of range of the base station, for example. In addition to the battery drain, in some circumstances this may result in wasted network resources as well.

Various approaches have been used in the prior art to address this problem. By way of example, U.S. Pat. No. 5,794,146 is directed to a method for conserving battery power in a mobile station searching to select a serving cell. The mobile station varies the interval between scans for the beacon signals of cells in a communications system to save battery power when the mobile station is searching to select a serving cell. The interval between scans is increased in response to the time elapsed since the start of the search. Initially, the scans are conducted with a small interval therebetween in the hope of quickly acquiring a serving cell. If a serving cell is not selected during this initial period of time, then the interval between scans is calculated to increase in response to the increase in elapsed time since the start of the search. If a serving cell is not selected during this period of calculated intervals, then the interval is set to a maximum limit to save battery power. The interval between scans may also be changed based upon the quantity and signal strength of beacon signals provided by neighboring serving cells (i.e., base stations).

Despite the presence of such prior art systems, additional flexibility may be desired in some applications for varying scan rates for accessing a cellular base station to save battery power and reduce waste of network resources.

SUMMARY OF THE INVENTION

In view of the foregoing background, it is therefore an object of the present invention to provide a cellular communications system providing enhanced mobile cellular communications device battery saving features and related methods.

This and other objects, features, and advantages in accordance with the present invention are provided by a cellular communications system which may include at least one base station and at least one mobile cellular communications device. More particularly, the at least one mobile cellular communications device may include a controller, at least one user input device connected to the controller, and a wireless transceiver cooperating with the controller for attempting to establish a wireless communications link with at least one base station. If the wireless communications link cannot be established, then the controller continues to attempt to establish the wireless communications link at a first attempt rate. Moreover, if a user provides a request to access the at least one base station via the at least one user input device, then the controller may continue to attempt to establish the wireless communications link based upon a second attempt rate greater than the first attempt rate.

Accordingly, the mobile cellular communications device advantageously attempts to establish the wireless communications link more often when a user requires access to the base station. By way of example, the access request may be a request to place a telephone call, as well as request to send an electronic mail (email) message (i.e., placing an email message in an outbound queue). Otherwise, if the user does not need to initiate wireless communications, the controller uses the slower, first access rate to reduce battery drain. The at least one user input device may be a keypad, for example.

In accordance with another advantageous aspect of the invention, the controller may also successively decrease at least one of the first and second attempt rates after each unsuccessful attempt to establish the wireless communications link. Such a step down in the attempt rate may provide further battery savings for the mobile cellular communications device. The cellular communications system may further include a central switching station for interfacing the at least one base station with a wired communications network, such as a public-switched telephone network (PSTN) or the Internet, for example. Further, the wireless communications link may be for data service or voice service.

A method aspect of the invention is for using a mobile cellular communications device including at least one user input device, such as the one described briefly above. The method may include attempting to establish a wireless communications link with at least one base station, and if the wireless communications link cannot be established, then continuing to attempt to establish the wireless communications link at a first attempt rate. Furthermore, if a user provides a request to access the at least one base station via the at least one user input device, continuing attempts to establish the wireless communications link may be made based upon a second attempt rate greater than the first attempt rate.

A mobile cellular communications device, such as the one described briefly above, as well as a related computer-readable medium, are also provided.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in alternate embodiments.

Figure 1:
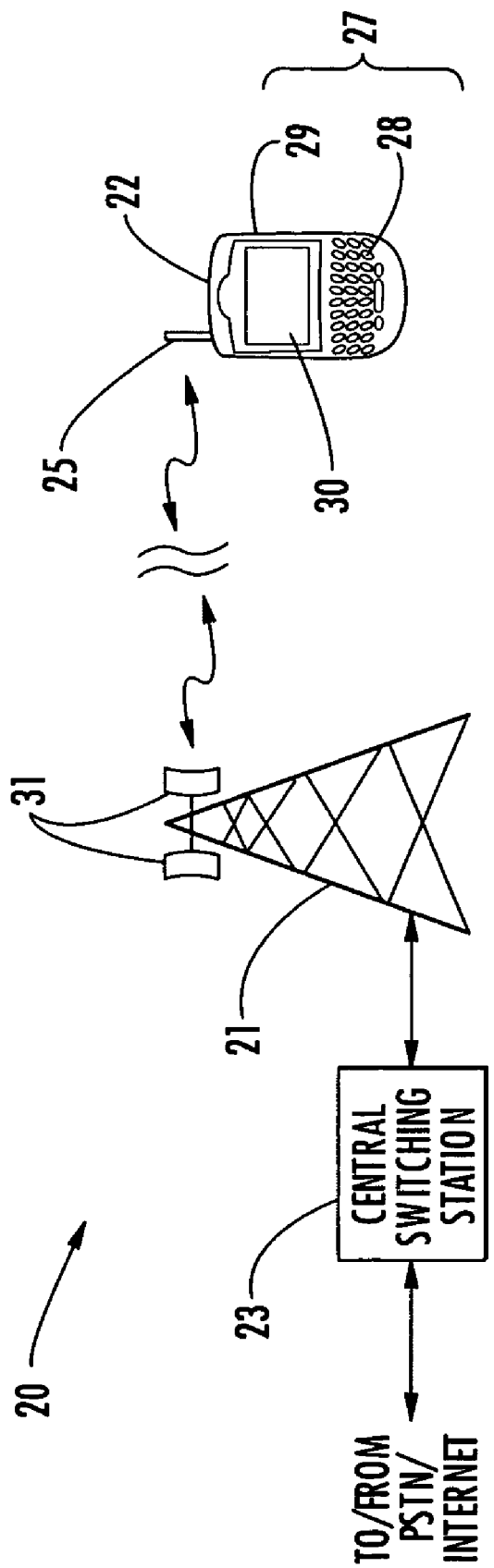
FIG. 1 is a schematic block diagram illustrating a cellular communications system in accordance with the present invention.
Figure 2:
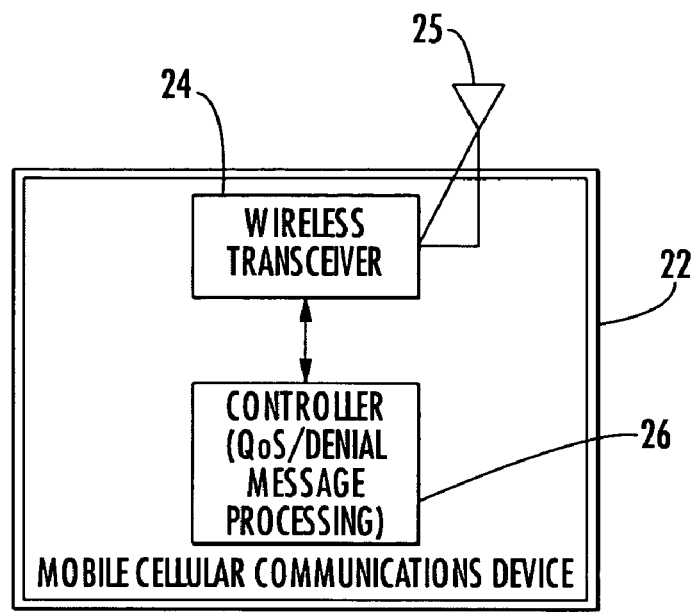
FIG. 2 is a schematic block diagram illustrating a mobile cellular communications device of the system of FIG. 1.
Figure 5:
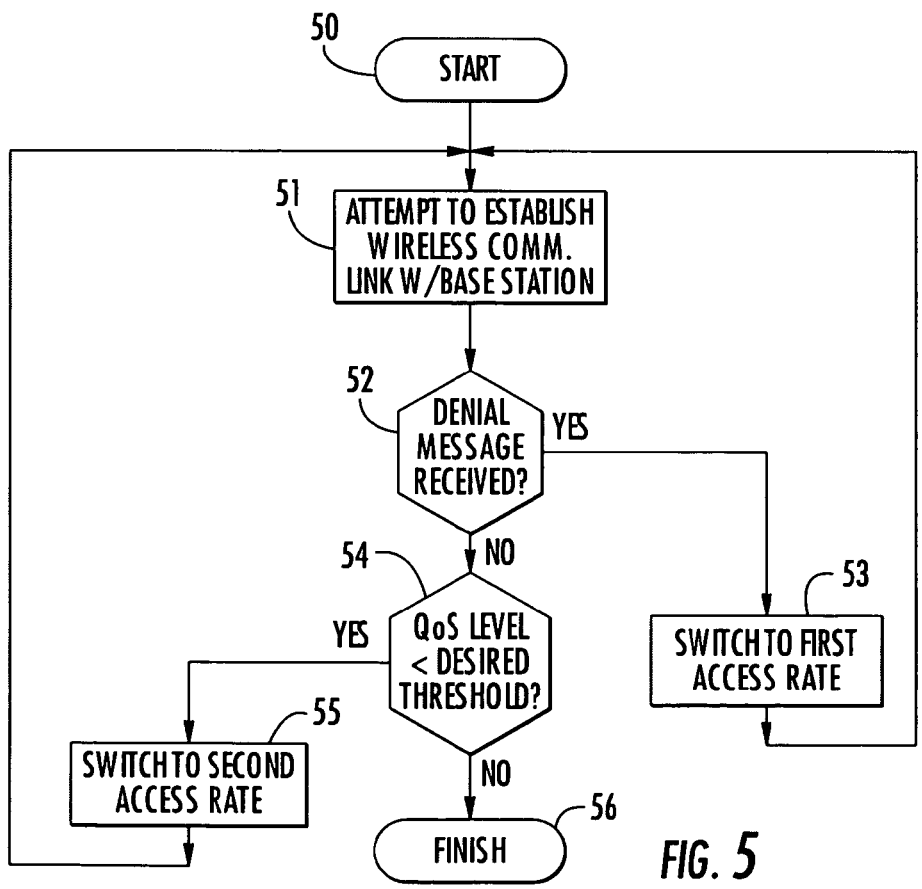
FIGS. 5-7 are block diagrams illustrating cellular communications method aspects of the present invention.

Referring initially to FIGS. 1, 2, and 5, a first embodiment of a cellular communications system 20 in accordance with the present invention is now described. The cellular communications system 20 illustratively includes a base station 21 (illustratively represented as a cell tower) for communicating with a mobile cellular communications devices 22. In the illustrated example, the mobile cellular communications device 22 is a Blackberry device, which allows a user to not only place and receive voice calls, but also to access other services such as electronic mail (email) and Internet browsing via the base station 21.

In this regard, the system 20 further includes a central switching station 23 which interfaces the base station 21 (and, thus, the mobile cellular communications device 22), with a "wired" network such as a public-switched telephone network (PSTN) and/or the Internet, for example. That is, the central switching station 23 includes the appropriate switching and control circuitry for routing voice calls to and from the mobile cellular communications device 22, as will be appreciated by those skilled in the art. It may further include an email/Web server (not shown) for providing access to email or Web content on the mobile cellular communications device 22 via the base station 21, as will also be appreciated by those skilled in the art.

It should be noted that while only a single mobile cellular communications device 22 and a single base station 21 are shown for clarity of illustration, a typical cellular communications system will include numerous base stations which allow numerous cellular communications devices to obtain service from the network as they move from one location to another, as will be appreciated by those skilled in the art. Moreover, the various functions performed by the central switching station 23 may in fact be distributed among more than one station or location, as will also be appreciated by those skilled in the art. In addition, numerous other types of cellular devices may be used in accordance with the present invention as well, and such devices need not have access to all of the above-noted services (i.e., voice, email, and Internet browsing) in all embodiments.

The mobile cellular communications device 22 illustratively includes a wireless transceiver 24 and associated antenna 25, and a controller 26 connected to the wireless transceiver. The controller 26 cooperates with the wireless transceiver 24 to communicate with the base station 21, as will be appreciated by those skilled in the art. By way of example, the controller 26 may be implemented using a microprocessor and/or other suitable control circuitry with associated memory, as will be discussed further in the example provided below with reference to FIG. 8.

The mobile cellular communications device 22 further illustratively includes a user input device 27 connected to the controller 26. In the case of the illustrated Blackberry device, the user input device 27 includes a keypad 28 and a trackwheel 29, though both need not necessarily be used for every user initiated operation, as will be appreciated by those skilled in the art. Of course, other user input devices 27 may be used as well, such as touch screens, etc., as will be appreciated by those skilled in the art.

Among other functions, the user input device 27 allows a user to place voice calls, type emails and queue them up for transmission to the base station 21, and/or request access to a Web page, for example, depending upon a given implementation. The mobile cellular communications device 22 also illustratively includes a display 30 which cooperates with the controller 26 to display telephone numbers, email text, Web page content, etc., as will also be appreciated by those skilled in the art.

The base station 21 may communicate with the central switching station 23 via dedicated communications links, such a fiber optic links, free space optical (FSO) links, etc. The base station 21 has one or more antennas 31 and a transceiver (not shown) associated therewith for use in communication with the mobile cellular communications device 22, as will be appreciated by those skilled in the art. Various cellular formats and/or protocols may be used in accordance with the present invention, as will be discussed further below.

In particular, the present invention may be particularly advantageous for mobile cellular communications devices 22 that operate in accordance with different cellular formats, as they may perform multiple scan operations to determine what formats are offered in their present vicinity. That is, this may otherwise lead to significant battery drain and/or wasted network resources in some instances, which may be reduced in accordance with the present invention, as will be discussed further below.

More particularly, beginning at Block 50, when the mobile cellular communications device 22 is first turned on or enters a new cell area, for example, the device performs a scan to detect a beacon signal transmitted by the base station 21 so that it may establish a wireless communications link (i.e., obtain service) from the base station (Block 51), as will be appreciated by those skilled in the art. Additionally, the mobile cellular communications device 22 will typically be set so that it will not establish a wireless communications link if a QoS level of signals received from the base station 21 is below a desired threshold. For example, a low QoS level may be indicative of a high bit error rate. Of course, other QoS measurements (e.g., delay, bandwidth, etc.) may also be used, as will be appreciated by those skilled in the art.

In some circumstances, the base station 21 may selectively deny attempts by the mobile cellular communications device 22 to establish a wireless communications link therewith. By way of example, this may occur when an available capacity of the base station 21 falls below a capacity threshold, meaning that the base station is too busy to communicate with new devices. This may also result when the base station 21 is administratively closed by cellular network personnel, but still acknowledges access requests from cellular devices, which may occur for various reasons that will be appreciated by those skilled in the art.

As noted above, multi-function devices such as Blackberry devices may not only be enabled for wireless voice service, but they may also be enabled for wireless data service (e.g., email data, Internet data, etc.) as well. Thus, such devices establish different wireless communications links with the base station 21 depending upon the type of service that is being provided, as the format of the signals being transferred will be different for different types of services, as will be appreciated by those skilled in the art.

Accordingly, in some instances, a base station may allow a wireless communications link to be established for voice service, but not for data service, and vice-versa. For example, some cellular service providers allow each others' customers to access their base stations for voice service, so that both providers can provide greater coverage areas. However, the data service provided by one service provider may not be compatible with the other provider's network. In such case, the base station 21 would allow a wireless communications link to be established with a wireless communications device 22 associated with a different network for voice service, but not data service. Furthermore, the base station 21 may allow the establishment of one kind of data services such as email which can tolerate relatively high delay and bit error rate, but may not allow other kinds of data service such as realtime video which requires high bandwidth and low delays.

For whatever reason, when the base station 21 denies a request to establish a wireless communications link therewith, it preferably sends a denial message for the denied attempt. The denial message may take various forms. For example, if the base station 21 is simply too busy to establish the new link, it may provide an acknowledgement (i.e., an ACK) of the request from the mobile cellular communications device 22, along with an indication that the link cannot be established at that time, as the denial message. Alternately, if the mobile cellular communications device 22 and the base station 21 do not operate using the same protocol (e.g., the base station does not belong to the user's cellular service provider), then the base station may return an authentication failure signal (i.e., a NAK) as the denial message.

In accordance with the invention, if the mobile cellular communications device 22 receives a denial message from the base station 21 in response to its attempt to establish a wireless communications link, at Block 52, the controller 26 continues to attempt to establish the wireless communications link at a first attempt (i.e., scan) rate, at Block 53. This wireless communications link may be for voice service or data service, as noted above. Yet, if the wireless communications link cannot be established with the desired QoS level, but no denial message is received (Block 54), then the controller 26 continues to attempt to establish the wireless communications link at a second attempt rate which is different than the first attempt rate, at Block 55.

That is, the controller 26 advantageously differentiates the reasons for an unsuccessful attempt to establish a wireless communications link, and it uses different attempt rates based upon the particular reason for the unsuccessful attempt. Thus, for example, where the QoS level is the reason the attempt is unsuccessful, and this is due to the fact that the user is passing from one cell coverage area to another (e.g., in a moving vehicle) or the signal is obstructed, as noted above. In such cases, the QoS level will typically remain below the desired threshold only for a relatively short time.

On the other hand, if the base station 21 denies the request to establish the wireless communications link, the time before the base station will be ready to establish the wireless communications link will in many circumstances be longer. Indeed, if a NAK is received, the mobile cellular communications device will need to move to a different location in which a compatible base station is operating before a wireless communications link may be obtained (excluding the case of emergency communications, in which device types associated with one cellular service provider may be allowed to communicate with base stations of another). The same may also be true of other reasons for denials by the base station 22 to establish wireless communications links.

As such, the first attempt rate may advantageously be less than the second attempt rate, although this need not be the case in all implementations. If the QoS level is above the desired threshold, and no denial message is received from the base station 21 responsive to the request to establish the wireless communications link, the wireless communications link is established, thus concluding the illustrated method (Block 56).

Although the method is shown as concluding at Block 56, it should be noted that the controller 26 may continue to cooperate with the wireless transceiver 24 for determining if the QoS level of the wireless communications link, once established, falls below the desired QoS level. If it does, then the controller 22 may attempt to re-establish the wireless communications link with the desired QoS level at the second attempt rate based thereon, as similarly described above. The same may also be done using the first access rate if the wireless communications link, once established, is terminated by the base station 22 due to an administrative closing, for example, as will be appreciated by those skilled in the art.

Of course, it should be noted that in certain circumstances the reason for an unsuccessful attempt to establish a wireless communications link may not result in a denial message being received, or from a QoS problem. For example, if the base station 21 is taken offline for maintenance, etc., the mobile cellular communications device 22 will receive no signals from the base station 21 at all. In such case, the controller 26 could be set to simply determine that the QoS level is below the desired threshold, in which case the second access rate is used, or the controller could default to the first access rate, whichever is most appropriate for the particular implementation. It should also be noted that the controller 26 could also switch from either of the first or second access rates to some lower minimum rate(s) if the wireless communications link is not established within a certain period of time, to provide still further battery and/or network resource usage savings.

Figure 3:
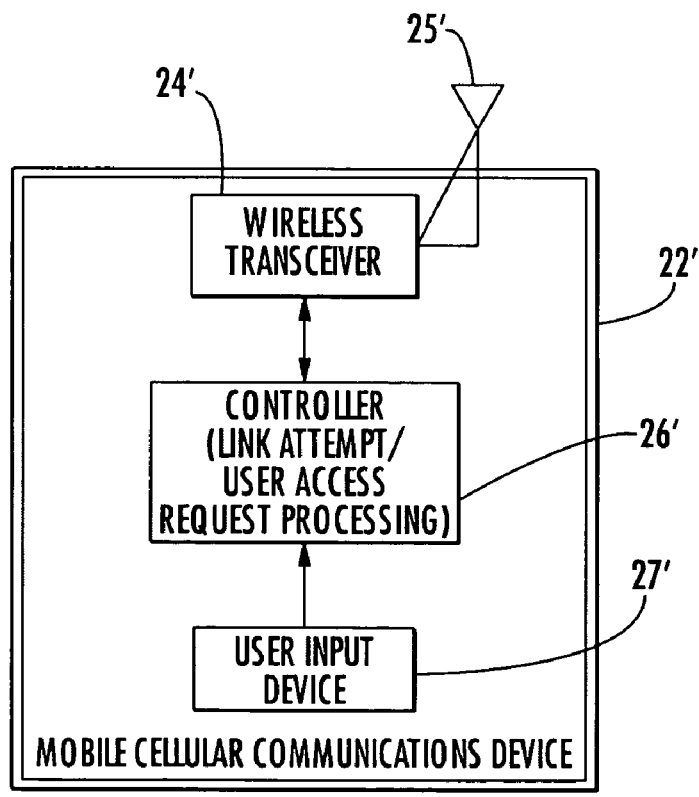
FIG. 3 is a schematic block diagram illustrating an alternate embodiment of the mobile cellular communications device of FIG. 2.
Figure 6:
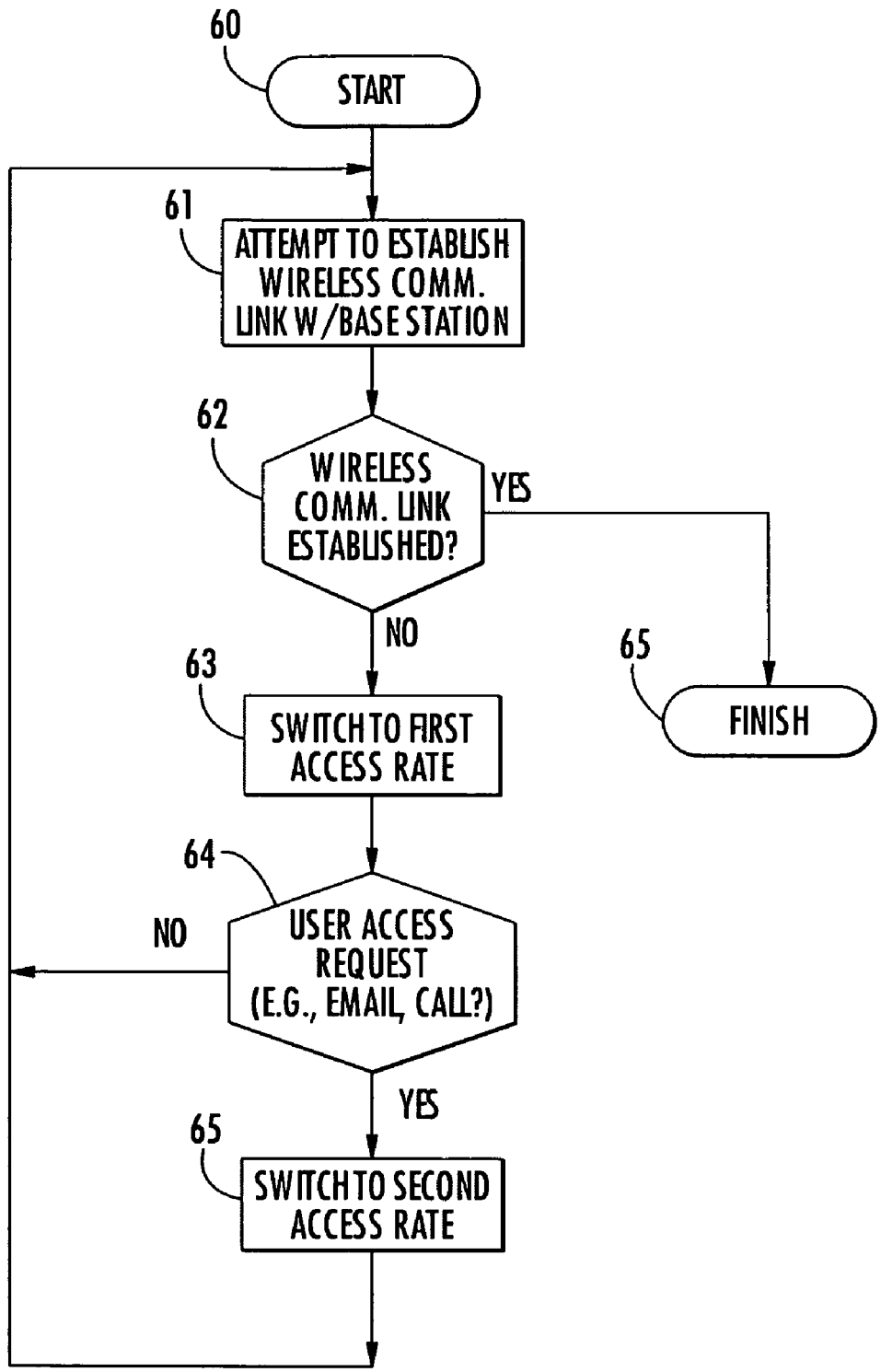

Turning to FIGS. 3 and 6, another embodiment of the cellular communications system 20' is now described. As noted above, the mobile cellular communications device 22' illustratively includes a user input device(s) 27' connected to the controller 26'. Beginning at Block 60, the controller 26' cooperates with the wireless transceiver 24' for attempting to establish the wireless communications link with the base station 22, as also discussed above. If the wireless communications link cannot be established (Block 62), for whatever reason (e.g., QoS level, denial, etc.), then the controller 26' continues to attempt to establish the wireless communications link at a first attempt rate, at Block 63.

If while the controller 26' is still attempting to establish the wireless communications link a user provides a request to access the base station 21 via the user input device 27', at Block 64, then the controller continues to attempt to establish the wireless communications link based upon a second attempt rate greater than the first attempt rate, at Block 65. Thus, for example, if the user attempts to place a voice call, or queues up an email message for delivery, then the controller 26' will attempt to establish the wireless communications link more often than if the user does not otherwise need to initiate wireless communications. The illustrated method concludes upon the establishment of the wireless communications link, at Block 65.

Figure 4:
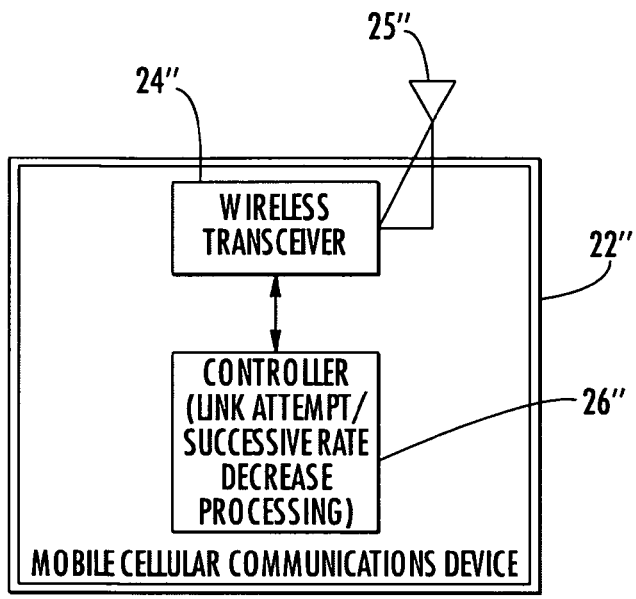
FIG. 4 is a schematic block diagram illustrating another alternate embodiment of the mobile cellular communications device of FIG. 2.
Figure 7:
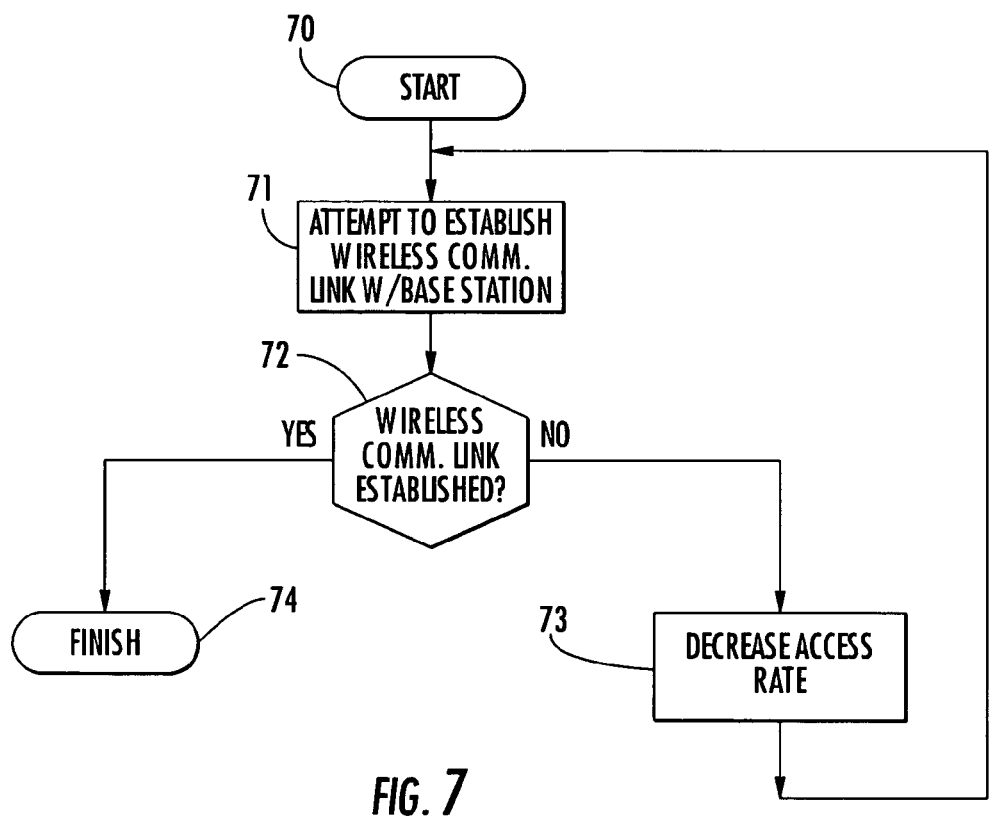

Still another embodiment of the present invention is now described with reference to FIGS. 4 and 7. More particularly, beginning a Block 70, the controller 26" cooperates with the wireless transceiver 24" for attempting to establish a wireless communications link with the base station 22, at Block 71, as described above. If the wireless communications link cannot be established, at Block 72, then the controller 26" continues to attempt to establish the wireless communications link at an attempt rate which decreases following each unsuccessful attempt, at Block 73. Stated alternately, the controller 26" successively steps down the access rate after each unsuccessful attempt to establish the communications link. Otherwise, the illustrated method is concluded, at Block 74.

The present invention may advantageously be implemented as a computer-readable medium having computer-executable instructions for causing a mobile communications device 22 to perform the steps described above. Moreover, it will also be appreciated that aspects described separately above with respect to separate embodiments for clarity of illustration may be combined in some applications. For example, the controller 22 may also increase one or both of the first and second access rates responsive to an access request from a user, as described with reference to FIG. 6, and/or successively decrease one or both of these rates after each unsuccessful attempt to establish the wireless communications link, as described with reference to FIG. 7.

EXAMPLE

Figure 8:
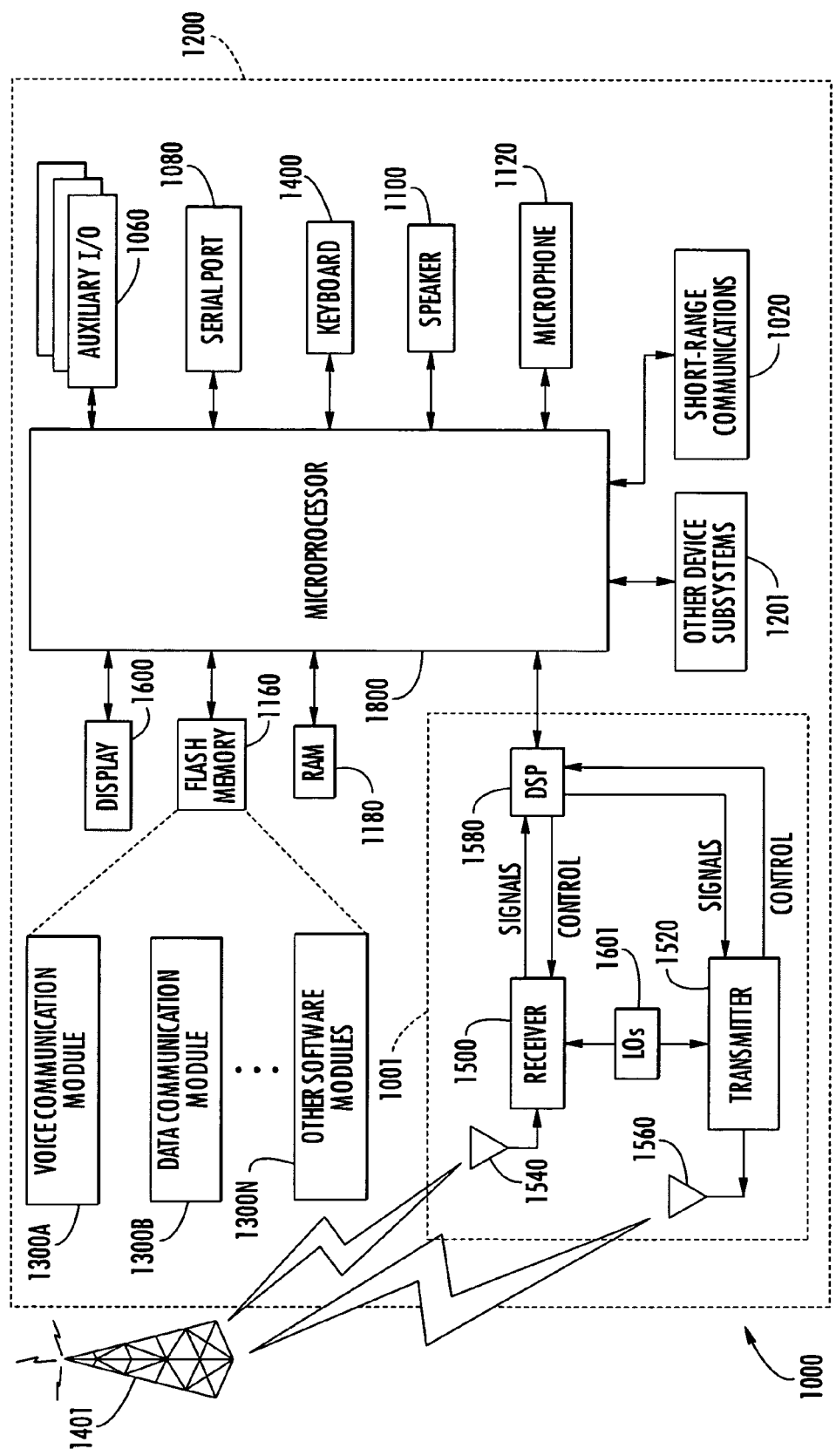
FIG. 8 is a schematic block diagram illustrating further aspects of a mobile cellular communications device suitable for use with the present invention.

Turning now additionally to FIG. 8, additional aspects of an exemplary hand-held mobile cellular communications device 1000 (i.e., a Blackberry device) that can be used in accordance with the present invention are now described. The device 1000 illustratively includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

In addition to the processing device 1800, other parts of the mobile device 1000 include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A cellular communications system comprising:
at least one base station; and
at least one mobile cellular communications device comprising a controller, at least one user input device connected to said controller, and a wireless transceiver for cooperating with said controller for
attempting to establish a wireless communications link with said at least one base station, and if the wireless communications link cannot be established, then continuing to attempt to establish the wireless communications link at a first attempt rate, and
if a user provides a request to access said at least one base station via said at least one user input device, then continuing to attempt to establish the wireless communications link based upon a second attempt rate greater than the first attempt rate.

2. The cellular communications system of claim 1 wherein the access request comprises a request to place a telephone call.

3. The cellular communications system of claim 1 wherein the access request comprises a request to send an electronic mail (email) message.

4. The cellular communications system of claim 1 wherein said at least one user input device comprises a keypad.

5. The cellular communications system of claim 1 wherein said controller successively decreases at least one of the first and second attempt rates after each unsuccessful attempt to establish the wireless communications link.

6. The cellular communications system of claim 1 further comprising a central switching station for interfacing said at least one base station with a wired communications network.

7. The cellular communications system of claim 1 wherein the wireless communications link is for data service.

8. The cellular communications system of claim 1 wherein the wireless communications link is for voice service.

9. A mobile cellular communications device comprising:
a controller;
at least one user input device connected to said controller; and
a wireless transceiver for cooperating with said controller for
attempting to establish a wireless communications link with at least one base station, and if the wireless communications link cannot be established, then continuing to attempt to establish the wireless communications link at a first attempt rate, and
if a user provides a request to access said at least one base station via said at least one user input device, then continuing to attempt to establish the wireless communications link based upon a second attempt rate greater than the first attempt rate.

10. The mobile cellular communications device of claim 9 wherein the access request comprises a request to place a telephone call.

11. The mobile cellular communications device of claim 9 wherein the access request comprises a request to send an electronic mail (email) message.

12. The mobile cellular communications device of claim 9 wherein said at least one user input device comprises a keypad.

13. The mobile cellular communications device of claim 9 wherein said controller successively decreases at least one of the first and second attempt rates after each unsuccessful attempt to establish the wireless communications link.

14. A method for using a mobile cellular communications device comprising at least one user input device comprising:
attempting to establish a wireless communications link with at least one base station, and if the wireless communications link cannot be established, then continuing to attempt to establish the wireless communications link at a first attempt rate; and
if a user provides a request to access the at least one base station via the at least one user input device, then continuing to attempt to establish the wireless communications link based upon a second attempt rate greater than the first attempt rate.

15. The method of claim 14 wherein the access request comprises a request to place a telephone call.

16. The method of claim 14 wherein the access request comprises a request to send an electronic mail (email) message.

17. The method of claim 14 wherein the at least one user input device comprises a keypad.

18. The method of claim 14 further comprising successively decreasing at least one of the first and second attempt rates after each unsuccessful attempt to establish the wireless communications link.

19. A non-transitory computer-readable medium having computer-executable instructions for causing a mobile cellular communications device comprising at least one user input device to perform steps comprising:

attempting to establish a wireless communications link with at least one base station, and if the wireless communications link cannot be established, then continuing to attempt to establish the wireless communications link at a first attempt rate; and if a user provides a request to access the at least one base station via the at least one user input device, then continuing to attempt to establish the wireless communications link based upon a second attempt rate greater than the first attempt rate.

20. The non-transitory computer-readable medium of claim 19 wherein the access request comprises a request to place a telephone call.

21. The non-transitory computer-readable medium of claim 19 wherein the access request comprises a request to send an electronic mail (email) message.

22. The non-transitory computer-readable medium of claim 19 further comprising computer-executable instructions for causing the mobile cellular communications device to perform a step comprising successively decreasing at least one of the first and second attempt rates after each unsuccessful attempt to establish the wireless communications link.

* * * * *